US010634218B2

(12) United States Patent
Hall et al.

(10) Patent No.: US 10,634,218 B2
(45) Date of Patent: Apr. 28, 2020

(54) MULTIPLYING NESTED GEARBOX

(71) Applicants: David R. Hall, Provo, UT (US); Daniel Madsen, Vineyard, UT (US); Benjamin Taylor, Provo, UT (US); Nathan Davis, Bountiful, UT (US)

(72) Inventors: David R. Hall, Provo, UT (US); Daniel Madsen, Vineyard, UT (US); Benjamin Taylor, Provo, UT (US); Nathan Davis, Bountiful, UT (US)

( * ) Notice: Subject to any disclaimer, the term of this patent is extended or adjusted under 35 U.S.C. 154(b) by 318 days.

(21) Appl. No.: 15/800,775

(22) Filed: Nov. 1, 2017

(65) Prior Publication Data

US 2019/0128379 A1   May 2, 2019

(51) Int. Cl.
| | | |
|---|---|---|
| *F16H 1/46* | (2006.01) | |
| *B66D 1/22* | (2006.01) | |
| *B66D 1/12* | (2006.01) | |
| *B66D 1/30* | (2006.01) | |
| *B66D 1/48* | (2006.01) | |
| *B66D 1/36* | (2006.01) | |

(52) U.S. Cl.
CPC ............... *F16H 1/46* (2013.01); *B66D 1/12* (2013.01); *B66D 1/22* (2013.01); *B66D 1/225* (2013.01); *B66D 1/30* (2013.01); *B66D 1/36* (2013.01); *B66D 1/485* (2013.01)

(58) Field of Classification Search
CPC ... B66D 1/22; B66D 1/12; B66D 1/34; B66D 1/36; B66D 1/485; F16H 1/2818; F16H 1/46
See application file for complete search history.

(56) References Cited

U.S. PATENT DOCUMENTS

| | | | | |
|---|---|---|---|---|
| 2,246,923 A | * | 6/1941 | Meunier ............... | B66D 5/026 254/356 |
| 2,583,140 A | * | 1/1952 | Else ....................... | B66D 1/12 475/265 |
| 3,885,656 A | * | 5/1975 | Michling ................ | B66D 1/22 192/225 |
| 4,161,126 A | * | 7/1979 | Winzeler ................ | B66D 1/22 254/344 |
| 4,328,954 A | * | 5/1982 | Logus .................... | B66D 1/44 192/18 A |
| 4,408,746 A | * | 10/1983 | Marsch ................... | B66D 1/22 188/170 |
| 4,663,128 A | * | 5/1987 | Helgeland .............. | C30B 15/30 117/201 |

(Continued)

*Primary Examiner* — Emmanuel M Marcelo

(57) ABSTRACT

A transmission apparatus is disclosed. The transmission apparatus includes at least a first gearset and a last gearset. Each gearset includes a sun gear, a set of planetary gears, and a ring gear. The ring gears have splined outer surfaces. Each gearset has a rotational speed and a torque. A drum encloses and mates with the gearsets. The drum has splined inner surfaces that mate with the splined outer surfaces. The last splined outer surface transfers the last torque of the last gearset directly to the drum. The drum transfers at least a portion of the last torque to the first splined outer surface of the first gearset. This reduces the first rotational speed of the first gearset and increases the first torque of the first gearset, thereby reducing the last rotational speed of the last gearset and increasing the last torque of the last gearset.

20 Claims, 14 Drawing Sheets

(56) References Cited

U.S. PATENT DOCUMENTS

| | | | | |
|---|---|---|---|---|
| 5,478,291 | A * | 12/1995 | Morisawa | F16H 3/66 475/144 |
| 5,860,635 | A * | 1/1999 | Morfitt | B63B 23/48 188/290 |
| 9,150,391 | B2 * | 10/2015 | Wurster | B66D 1/22 |
| 2003/0089897 | A1 * | 5/2003 | Hodge | B66D 1/22 254/344 |
| 2009/0114500 | A1 * | 5/2009 | Kato | F16D 25/0638 192/48.611 |
| 2010/0127228 | A1 * | 5/2010 | Xie | B66D 1/14 254/346 |
| 2010/0127229 | A1 * | 5/2010 | Kverneland | B66D 1/12 254/356 |
| 2011/0303886 | A1 * | 12/2011 | Cryer | B66D 1/22 254/340 |
| 2014/0084229 | A1 * | 3/2014 | Morrison | B66D 1/00 254/344 |
| 2015/0284223 | A1 * | 10/2015 | Hall | B66D 1/38 254/333 |
| 2015/0284230 | A1 * | 10/2015 | Hall | B66D 5/32 254/357 |
| 2015/0314846 | A1 * | 11/2015 | Paik | B63B 9/00 416/128 |
| 2019/0016571 | A1 * | 1/2019 | Thirunarayana | B66D 1/12 |

* cited by examiner

MULTIPLYING NESTED GEARBOX

FIELD OF THE INVENTION

The devices, systems, and methods described herein relate generally to reducing gearsets. More particularly, the devices, systems, and methods described herein relate to reductions in winches and similar devices.

BACKGROUND

Power tools are a household item, and are often used on a daily basis. Manufacturers of power tools are challenged with providing power tools that have diverse functionality and are easily operable. End users of power tools, such as drills and winches, often require high torque, low rpm tools, but also require compact size. A more compact, high torque gearset would be beneficial.

SUMMARY

A transmission apparatus is disclosed. The transmission apparatus includes at least a first gearset and a last gearset. The first gearset includes a first sun gear, a first set of planetary gears, and a first ring gear. The first ring gear has a first splined outer surface. The first gearset has a first rotational speed and a first torque. The first sun gear is driven by a motor. The last gearset includes a last sun gear, a last set of planetary gears, and a last ring gear. The last ring gear has a last splined outer surface. The last gearset has a last rotational speed and a last torque. The last rotational speed and the last torque are based on the first rotational speed and the first torque. The last set of planetary gears is mounted to a stationary object. A drum encloses and mates with the first gearset and the last gearset. The drum has a first splined inner surface that mates with the first splined outer surface and a last inner surface that mates with the last splined outer surface. The last splined outer surface transfers the last torque of the last gearset directly to the drum. The drum transfers at least a portion of the last torque to the first splined outer surface of the first gearset. This reduces the first rotational speed of the first gearset and increases the first torque of the first gearset, thereby reducing the last rotational speed of the last gearset and increasing the last torque of the last gearset.

The first planetary gears of the first gearset may be coupled to the last sun gear of the last gearset. The first rotational speed and the first torque of the first gearset may be delivered to the last sun gear.

A second gearset may be included between the first and the last gearsets. The second gearset may include a second sun gear, a second set of planetary gears, and a second ring gear. The second ring gear may have a second splined outer surface that mates with a second inner surface of the drum. The second gearset may have a second rotational speed and a second torque. The second sun gear may be coupled to the first set of planetary gears, and the second set of planetary gears may be coupled to the last sun gear. The drum may further transfer a portion of the last torque to the second splined outer surface of the second gearset. This reduces the second rotational speed of the second gearset and increases the second torque of the second gearset, thereby reducing the last rotational speed of the last gearset and increasing the last torque of the last gearset.

One or more intermediate gearsets may be included between the first and the last gearsets. Each of the intermediate gearsets may include an intermediate sun gear, an intermediate set of planetary gears, and an intermediate ring gear. The intermediate ring gears may have intermediate splined outer surfaces that mate with an intermediate inner surface of the drum. The one or more intermediate gearsets may have intermediate rotational speeds and intermediate torques. The one or more intermediate gearsets may be coupled in series and driven by the first set of planetary gears. The last sun gear may be driven by the one or more intermediate gearsets. The drum transfers a portion of the last torque to the intermediate splined outer surfaces of the one or more plurality of intermediate gearsets. This reduces the intermediate rotational speeds of the one or more intermediate gearsets and increases the intermediate torque of the one or more intermediate gearsets, thereby reducing the last rotational speed of the last gearset and increasing the last torque of the last gearset.

The motor may be mounted to the stationary object. The motor may be at least partially enclosed in the drum. The drum may be a winch spool, the outer surface of the drum having a ribbed spiraling path for a winch rope to follow. The winch rope may be attached to an end of the drum. The motor may rotate clockwise or counterclockwise such that the winch rope spools or unspools around the drum.

The motor may be mounted to a second stationary object.

A drilling attachment may be attached to the drum at an end opposite the last gearset.

The drum may be made of [materials]. The gearsets may be made of [materials].

The last set of planetary gears may be mounted to the stationary object by a disc. The disc may have an edge with a splined surface, and the stationary object having an opening the shape of the disc, such that the disc fits snuggly into the opening and does not rotate.

An outer surface of the drum may have gear teeth. The drum may be coupled to and rotates a [fan blades? millstone? tire? giant rotisserie spit?].

The motor may drive the first sun gear by driving a series of other gears that are coupled to the first sun gear.

BRIEF DESCRIPTION OF THE DRAWINGS

In order that the advantages of the described devices, systems, and methods will be readily understood, a more particular description of the described devices, systems, and methods briefly described above will be rendered by reference to specific embodiments illustrated in the appended drawings. Understanding that these drawings depict only typical embodiments of the described devices, systems, and methods and are not therefore to be considered limiting of its scope, the devices, systems, and methods will be described and explained with additional specificity and detail through use of the accompanying drawings, in which.

DETAILED DESCRIPTION

Figure 1A:
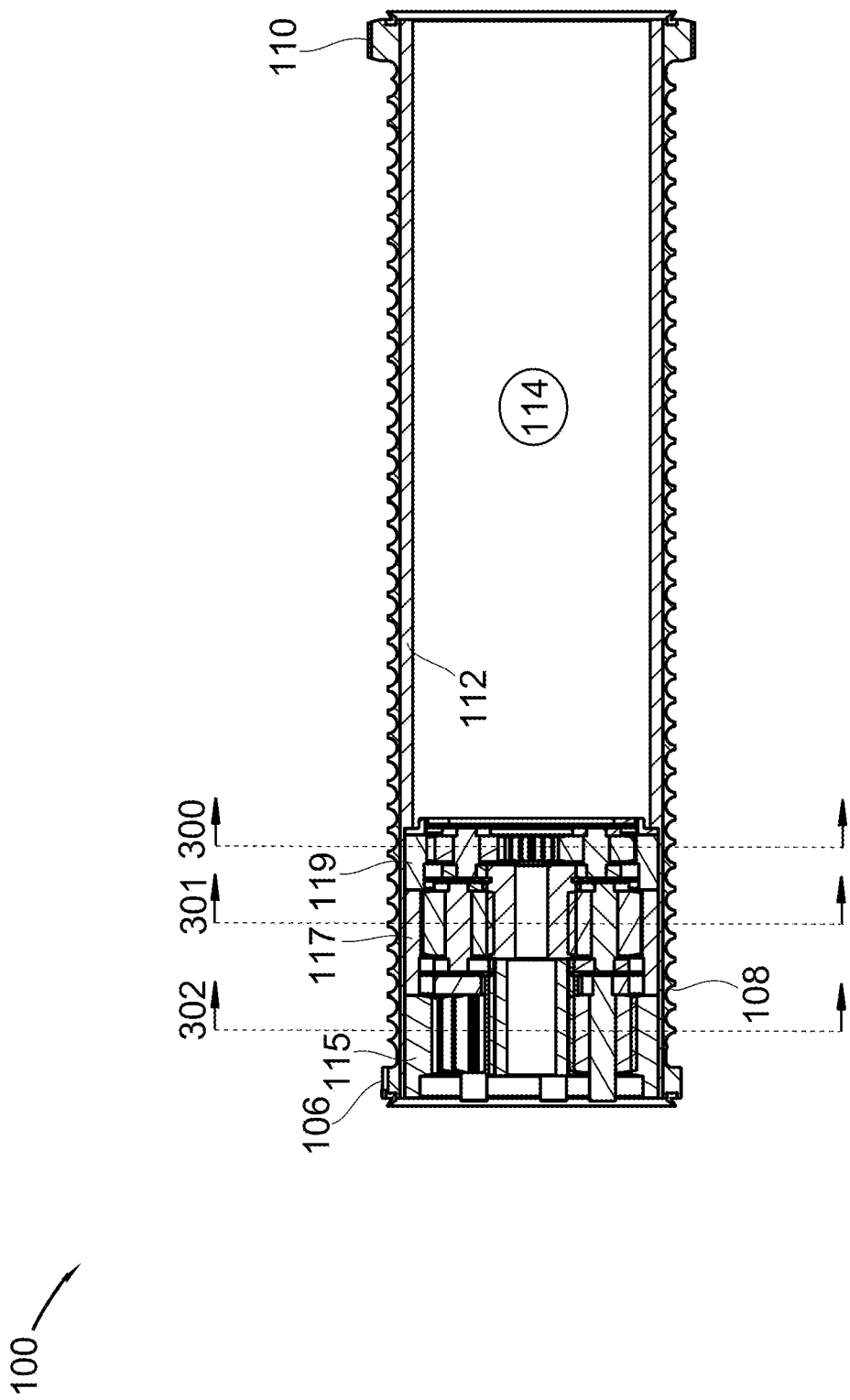
FIG. 1A shows a cutaway cross-sectional isometric front view of a drum.

It will be readily understood that the components of the described devices, systems, and methods, as generally described and illustrated in the Figures herein, could be arranged and designed in a wide variety of different configurations. Thus, the following more detailed description of the embodiments of the described devices, systems, and methods, as represented in the Figures, is not intended to limit the scope of the described devices, systems, and methods, as claimed, but is merely representative of certain examples of presently contemplated embodiments in accordance with the described devices, systems, and methods.

In winches and other low rotational speed, high torque applications, the size of gears is a significant constraint. While large industrial winches and other geared devices was the norm, the drive to miniaturize has led to smaller and smaller gears. However, there are limits to making a traditional sequence of gearsets (i.e., a linear sequence of gears) smaller. Rather than be limited to making a linear series of gears smaller, the devices, methods, and systems presented herein utilize "reverse multiplicative reduction" or rotational speed and "reverse multiplicative addition" of torque. These terms are defined in the following paragraphs.

While two or more gearsets in sequence may be used, for the sake of the explanation herein, a set of three gearsets in sequence are contained within a drum, the drum being rotationally locked or grounded to the ring gears of the three planetary gearsets. The set of planetary gears of the last gearset are constrained such that they cannot rotate around the last sun gear, but rather each of the planetary gears rotates individually, turning the last ring gear, and in turn, turning the drum. As the drum is rotationally locked to the previous gearsets, the drum turns the ring gears of the previous gearsets. Therefore, while in standard planetary gearsets there is only one input and one output per stage, in the present concept, the first and second gearsets each receive a second input. The first input is from a motor, propagated through the sun gears. The second input is from the rotation of the drum. This increases the reduction of rotation provided by the gearsets. Since the relative angular velocity of the drum to each stage gets faster from the second gearset to the first gearset, the second gearset receives more of a benefit that does the first gearset. Additional stages would all receive benefit, but the greatest benefit will always be for the gearset immediately preceding the last gearset.

The equations presented below show the reduction of each stage of gearsets. When there are only two gearsets, only Equations 1 and 2 apply. The last gearset has a traditional reduction for a stage of with a ring gear output and sun gear input. The first portion of Equations 2 and 3 is the traditional reduction for a stage with a carrier output and sun gear input. The second portion of Equations 2 and 3 is the added reduction from the rotating ring gear. The symbols in the equation are defined here.

$R_{Last}$=Number of teeth in Last Ring Gear
$S_{Last}$=Number of teeth in Last Sun Gear
$R_2$=Number of teeth in Second Ring Gear
$S_2$=Number of teeth in Second Sun Gear
$R_1$=Number of teeth in First Ring Gear
$S_1$=Number of teeth in First Sun Gear $$Reduction_{Last} = -\frac{R_{Last}}{S_{Last}} \qquad \text{Equation 1}$$

$$Reduction_2 = \left(1 + \frac{R_2}{S_2}\right) + \frac{R_2}{S_2}\frac{S_{Last}}{R_{Last}} \qquad \text{Equation 2}$$

$$Reduction_1 = \left(1 + \frac{R_1}{S_1}\right) + \frac{R_1}{S_1\left[\left(\frac{R_{Last}}{S_{Last}}\right)\left(1 + \frac{R_2}{S_2}\right) + \left(\frac{R_2}{S_2}\right)\right]} \qquad \text{Equation 3}$$

Figure 1B:
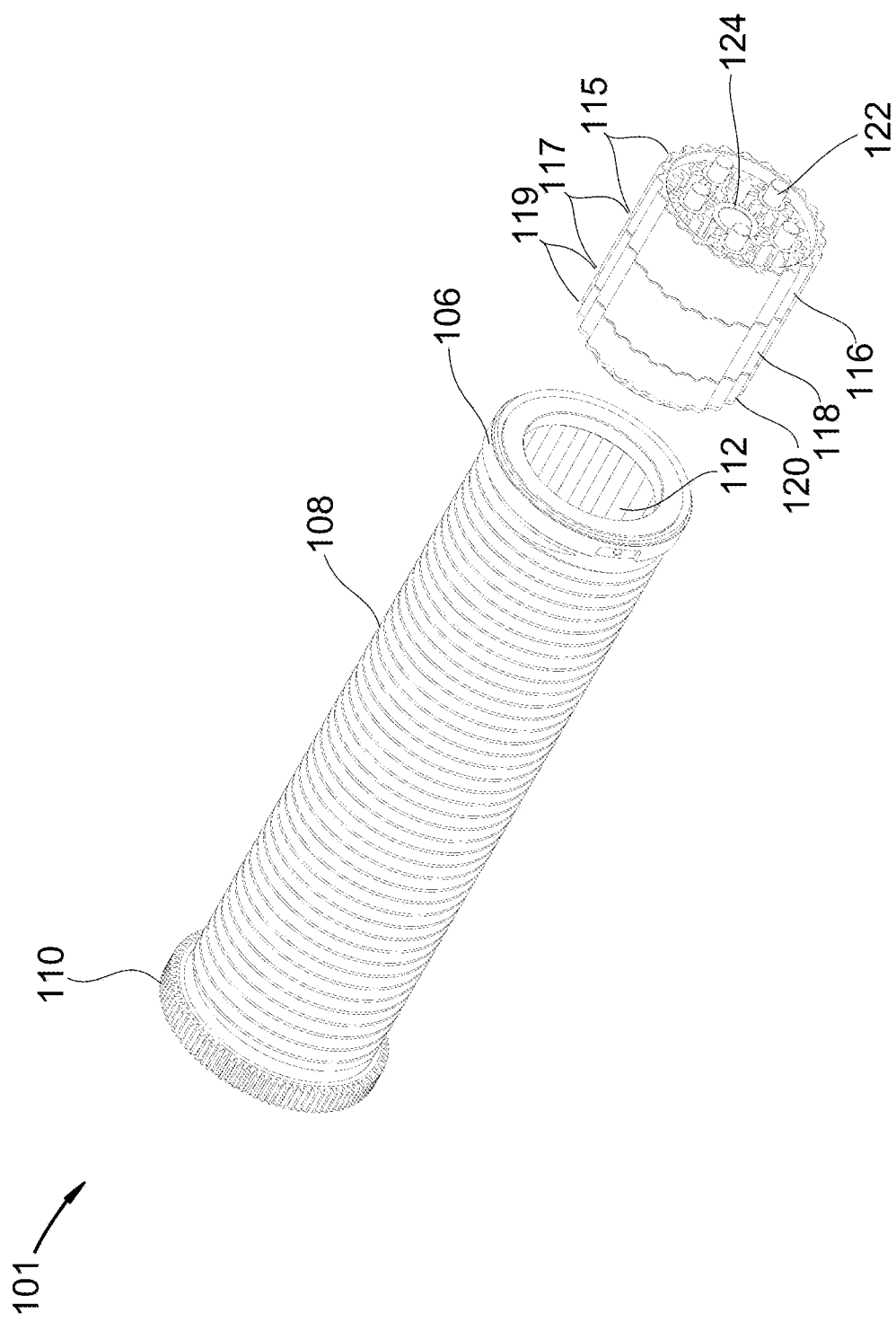
FIG. 1B shows a partially exploded back-top-right isometric view of the drum of FIG. 1A.
Figure 1C:
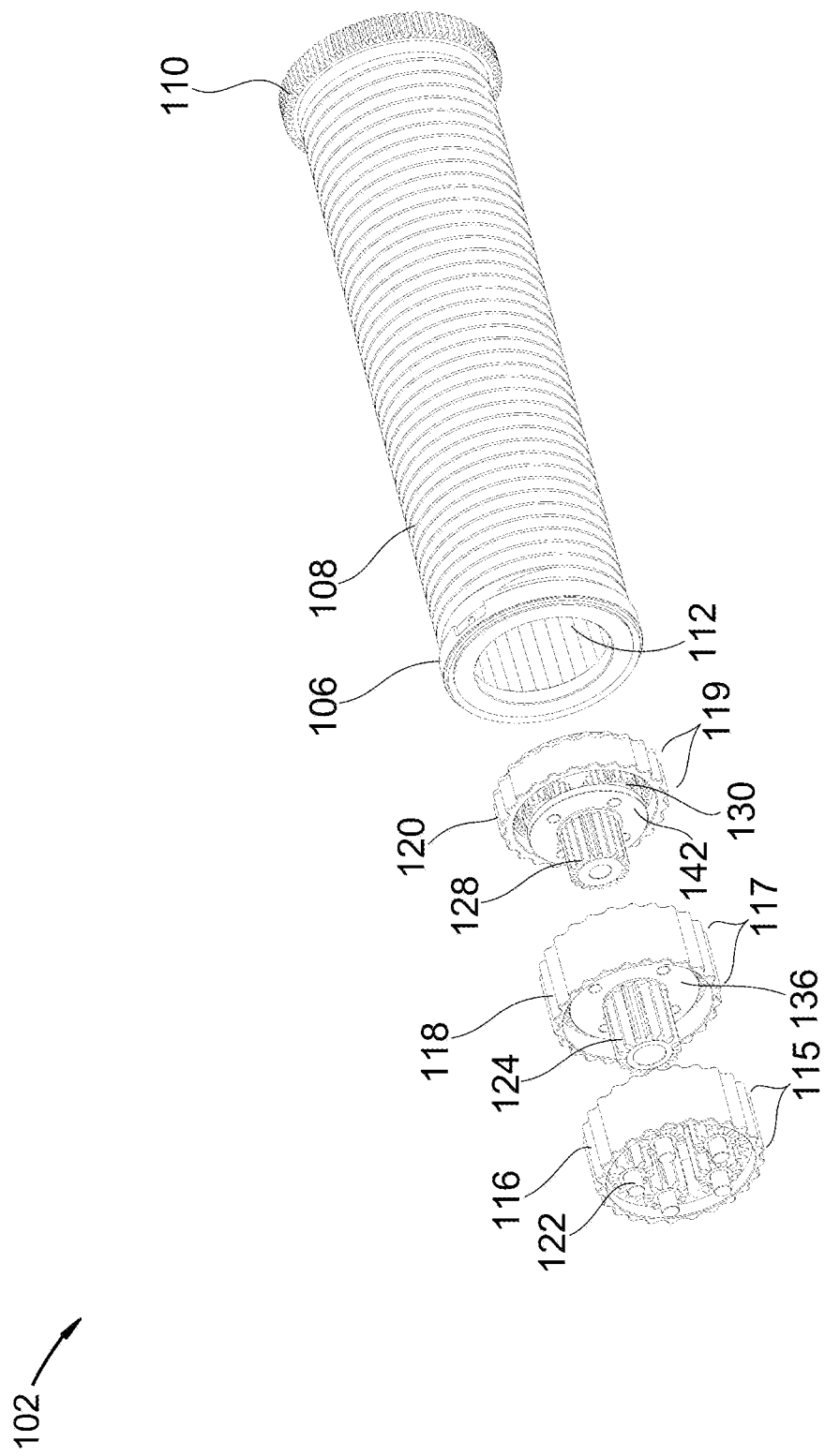
FIG. 1C shows a partially exploded front-top-left isometric view of the drum of FIG. 1A.
Figure 1D:
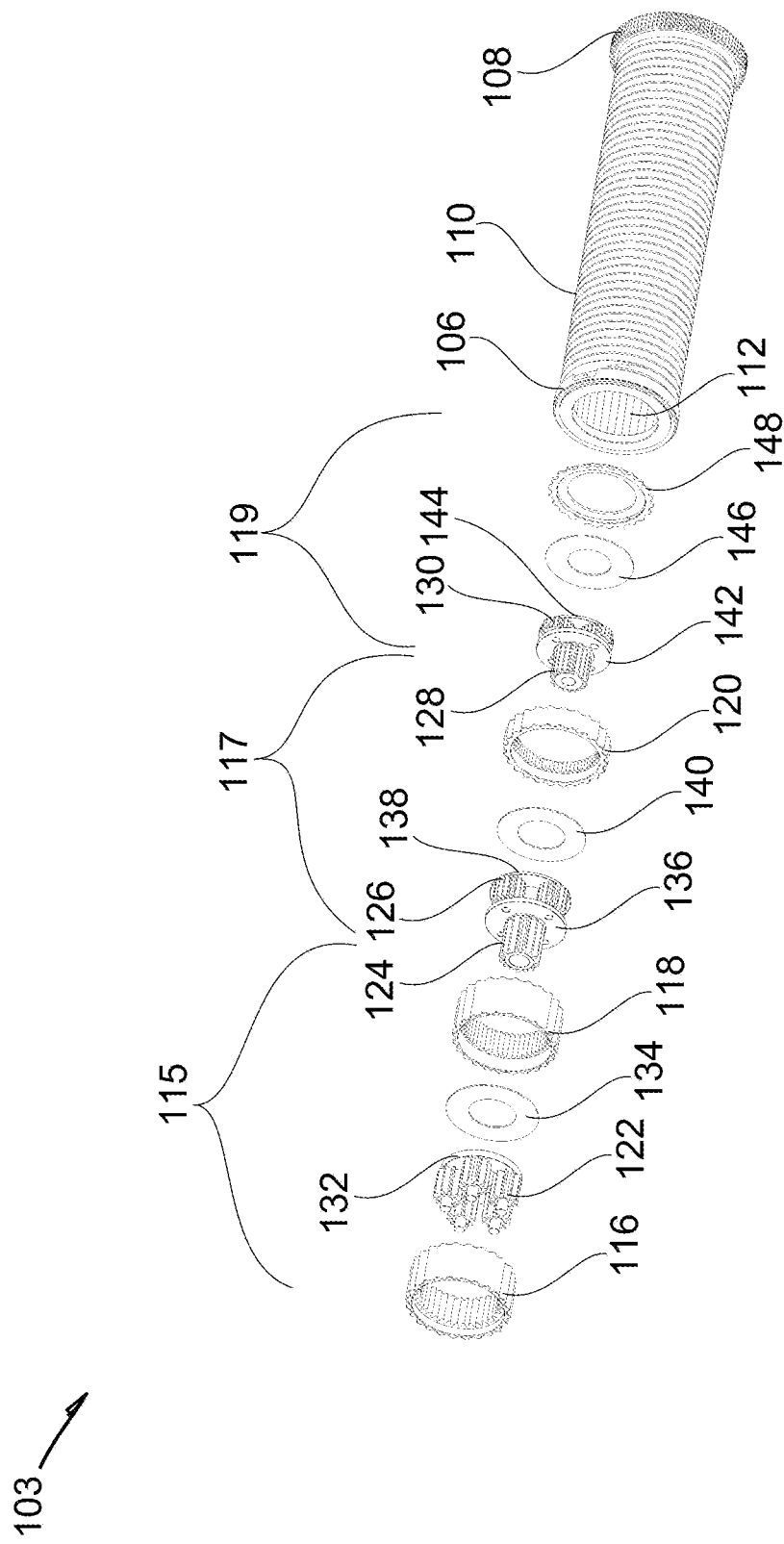
FIG. 1D shows an exploded front-left isometric view of the drum of FIG. 1A.
Figure 1E:
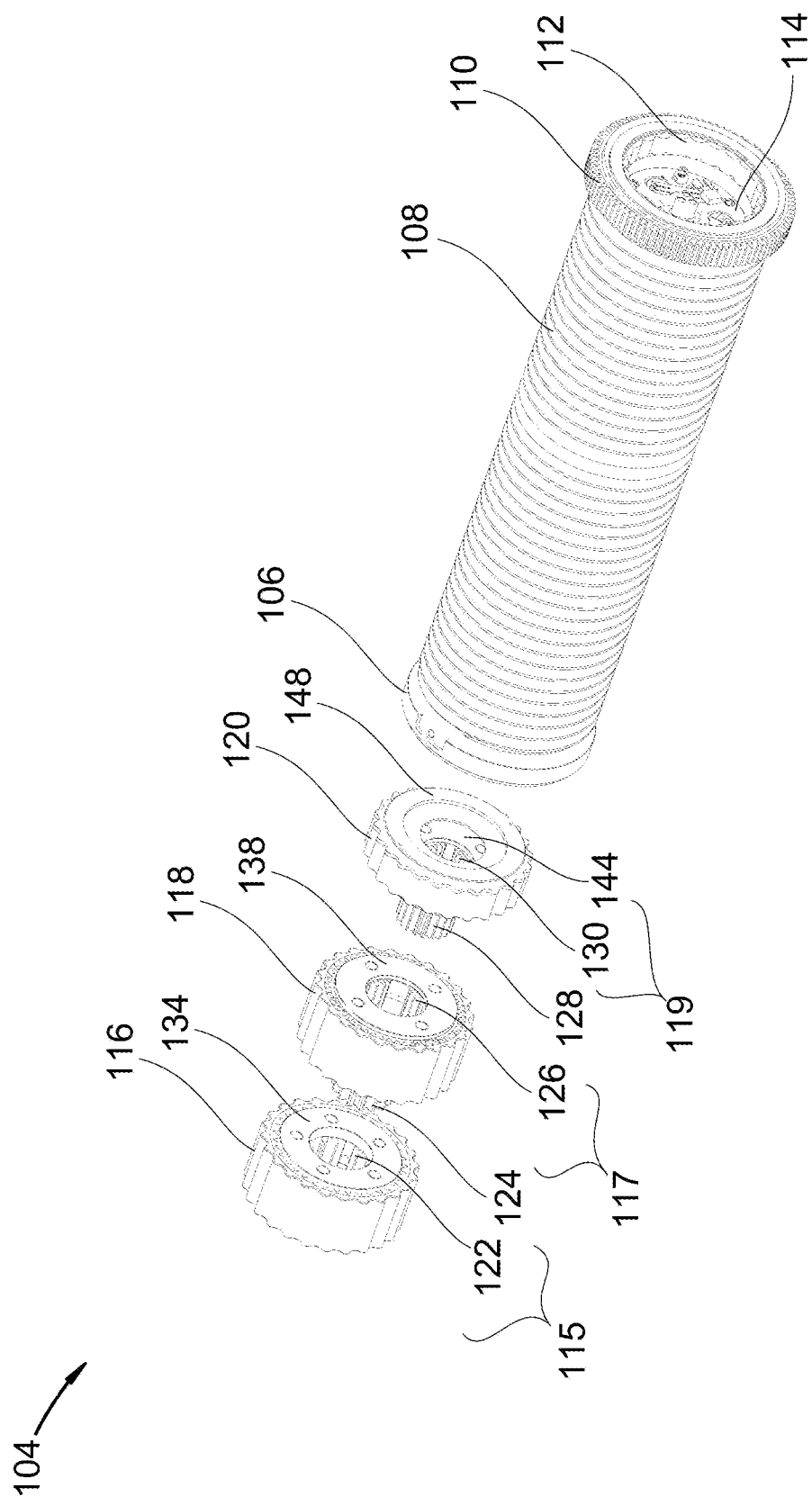
FIG. 1E shows a partially exploded front-top-right isometric view of the drum of FIG. 1A.
Figure 1F:
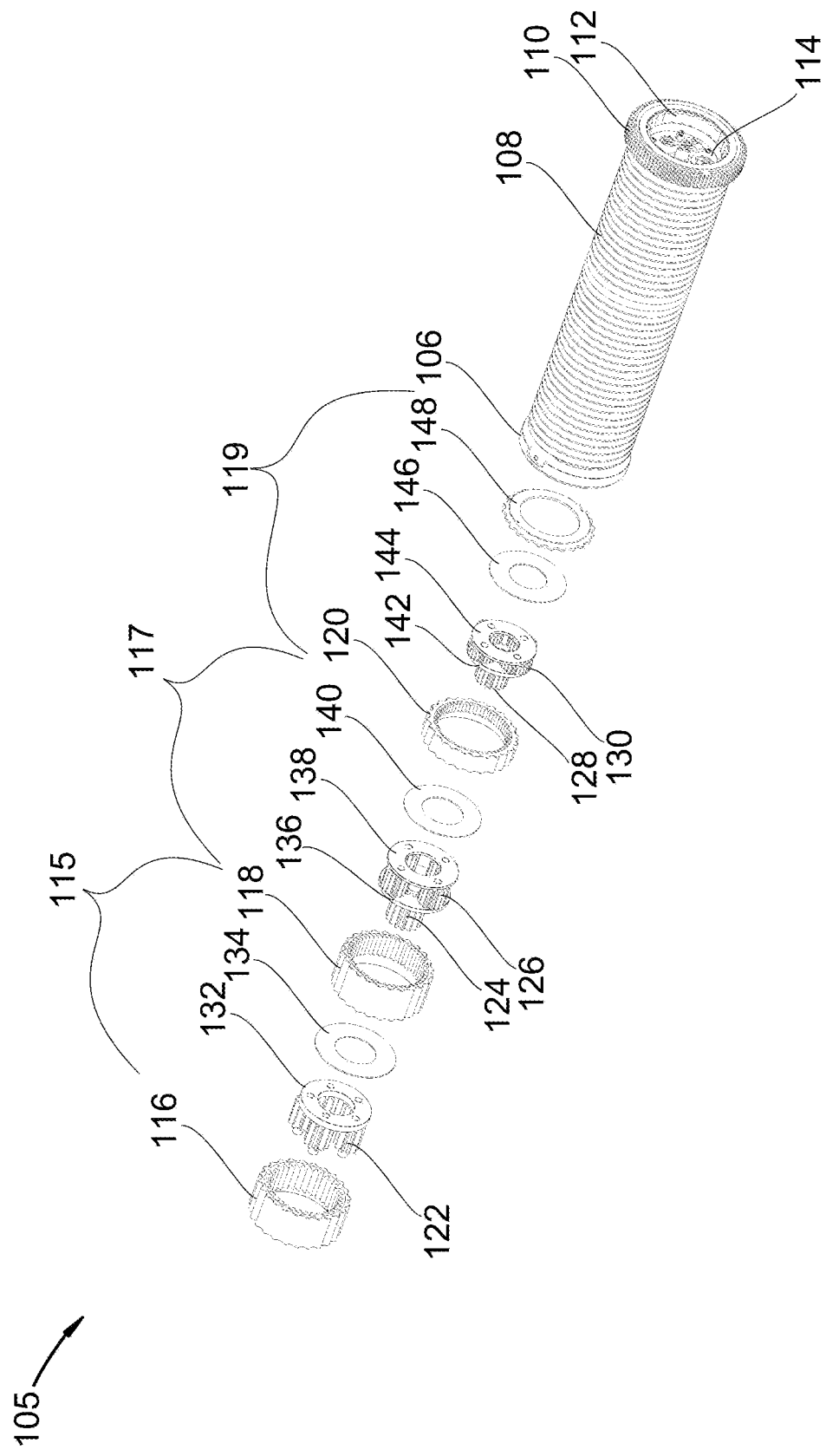
FIG. 1F shows an exploded front-top-right isometric view of the drum of FIG. 1A.

Referring now to the Figures, FIGS. 1A-F show various views 100-105 of a drum 106 that may be used in the described devices, systems, and methods. FIG. 1A shows a cutaway cross-sectional isometric front view of drum 106. FIG. 1B shows a partially exploded back-top-right isometric view of drum 106 of FIG. 1A. FIG. 1C shows a partially exploded front-top-left isometric view of drum 106 of FIG. 1A. FIG. 1D shows an exploded front-left isometric view of drum 106 of FIG. 1A. FIG. 1E shows a partially exploded front-top-right isometric view of drum 106. FIG. 1F shows an exploded front-top-right isometric view of drum 106 of FIG. 1A. In this example, drum 106 includes a drum seat 108, drum gear 110, drum core 112, and three gearsets, 115, 117, and 119. Drum seat 108 has cable grooves for spooling a cable. Motor 114 (not shown in FIG. 1A, but shown in part in FIGS. 1E and 1F) is contained within drum 106.

Motor 114, either directly or through a sequence of gear(s), drives the first gearset 119. The motor 114 is powered by a power source (not shown), such as a battery. In some cases, the motor 114 has a set of operating parameters (such as min/max operating voltages, max operating current, and the like, for example). While the motor 114 may not be designed to operate above the maximum operating current for long durations of time (e.g., 1 minute, minutes, hours, etc.), it is appreciated that the motor 114 may be able to operate at current levels above the maximum operating current for very short durations of time (e.g., seconds, 3 seconds, 5 seconds, etc.). With this in mind, a controller (not shown) that controls the operation of the motor 114 may allow a burst of current (above the maximum operating current of the motor 114, for example) on startup (for a very short duration of time) to increase the torque capacity of the gearset at startup. It is appreciated that this increased torque at startup may be beneficial for breaking static friction forces before moving to (usually lesser) dynamic friction forces. In some embodiments, this additional torque may facilitate the multiplicative reduction of the gearsets.

Figure 3A:
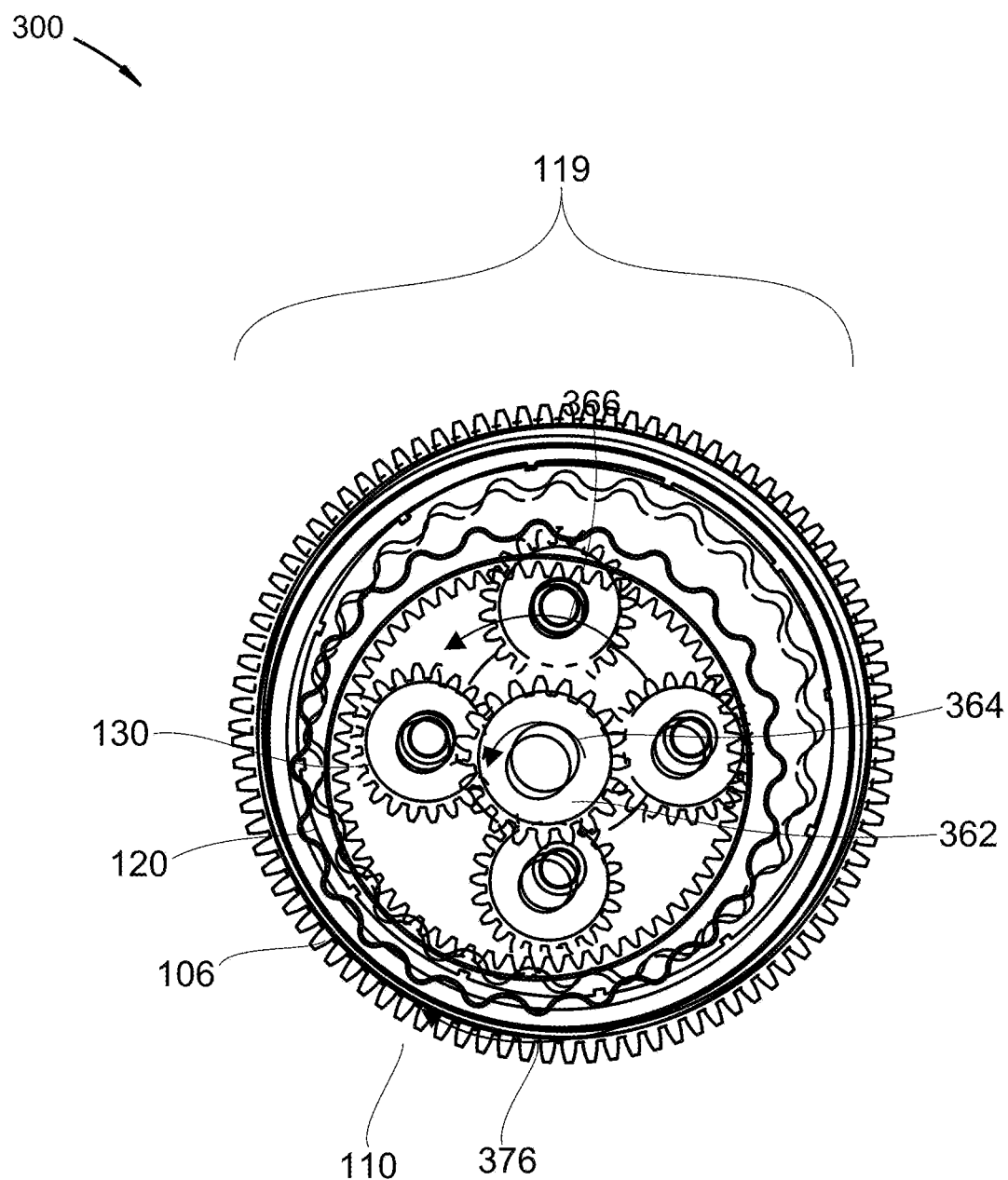
FIG. 3A shows an end-on view of the drum of FIG. 1A, cut through the first gearset.

First gearset 119 includes first washer 146, first ring gear 120, first carrier plate 144, first set of planetary gears 130, a back plate 148, and a first sun gear (not shown except in FIG. 3A). Second gearset 117 includes second washer 140, second ring gear 118, second carrier plate 138, second set of planetary gears 126, second mounting plate 142, and second sun gear 128. Last gearset 115 includes last washer 134, last ring gear 116, last carrier plate 132, last set of planetary gears 122, last mounting plate 136, and last sun gear 124.

First, second, and last ring gears 120, 118, and 116 each have splined outer surfaces that match the splined inner surface of drum core 112 (in some embodiments, one or more of the ring gears 120, 118, 116 may have a different diameter and the splined inner surface of drum core 112 may have corresponding areas for mating with the ring gears 120, 118, 116), locking first, second, and last ring gears 120, 118, and 116 rotationally with drum 106. Each gearset has a rotational speed and a torque. The first sun gear is driven by motor 114, the first sun gear then turning first set of planetary gears 130. First set of planetary gears 130 turns second sun gear 128, which turns second set of planetary gears 126. Second set of planetary gears 126 turn last sun gear 124, which turns last set of planetary gears 122. Last set of planetary gears 122 are mounted to a stationary object (see FIG. 2, for one example). As such, last set of planetary gears 122 turn drum 106. The rotational motion of drum 106 translates back to first ring gear 120 and second ring gear 118, increasing torque and reducing rotation of each of those ring gears, which then transfer the increased torque and decrease the rotation of their respective planetary gears and sun gears. This increased torque and decreased rotation then propagates back to last gearset 115, resulting in a lower final rotational speed and higher torque than without drum 106 reverse multiplying the rotational speed and torque. The mechanism behind this is explained further with regards to FIGS. 3A-C.

Figure 2A:
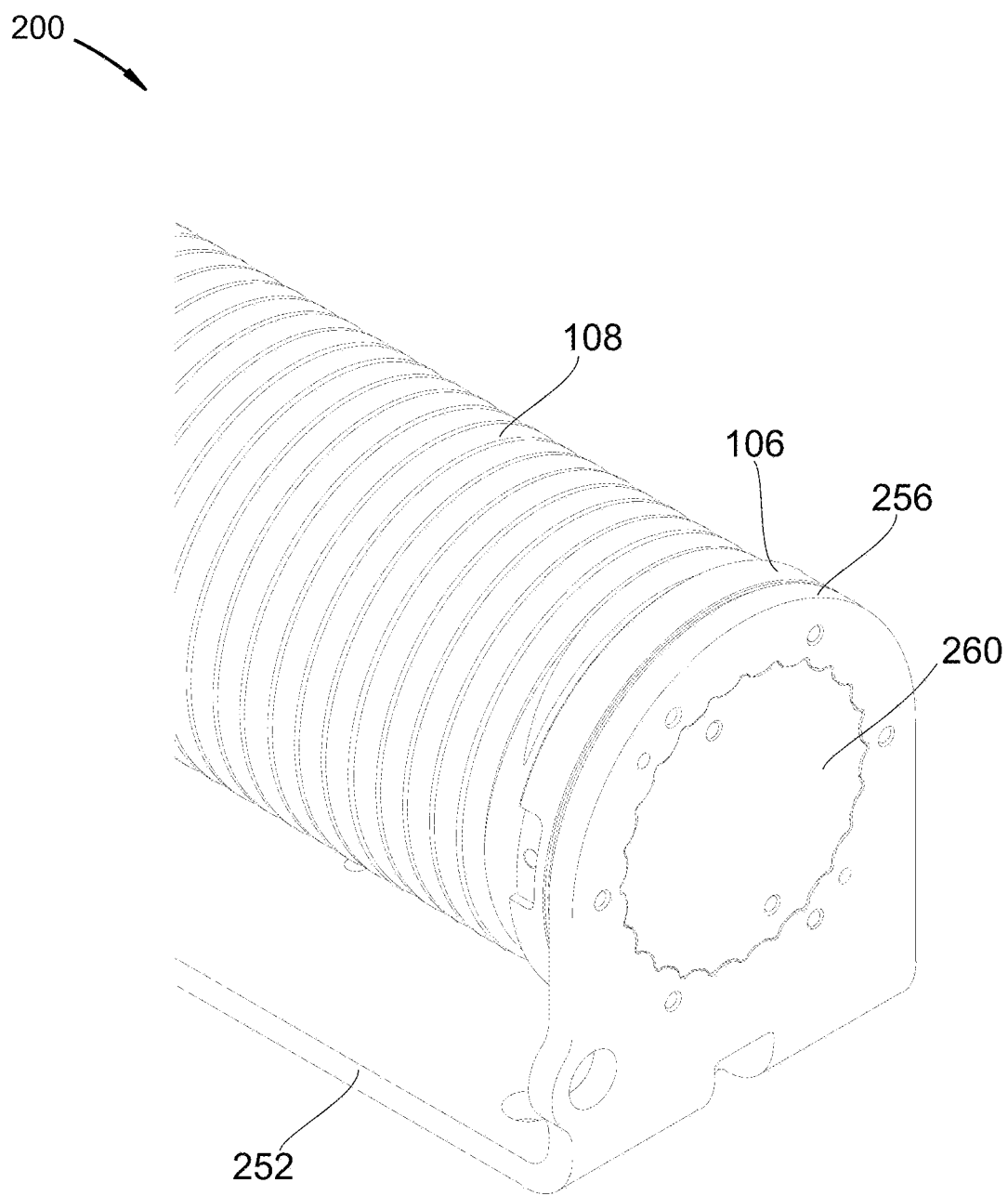
FIG. 2A shows a back-top-left isometric view of a portion of a mounting stand and the drum of FIGS. 1A-F.
Figure 2B:
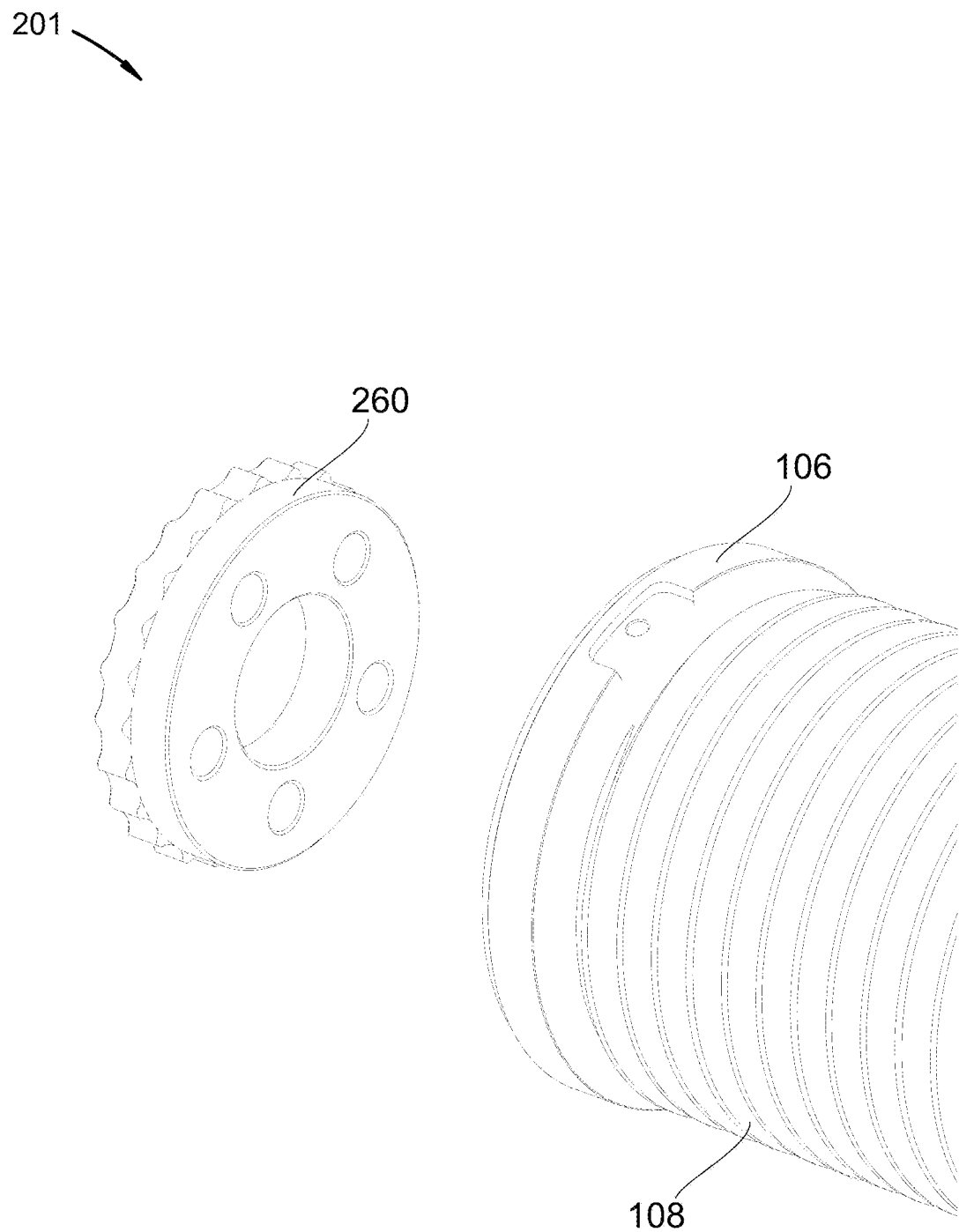
FIG. 2B shows a front-top-left isometric view of a portion of the mounting stand of FIG. 2A and the drum of FIGS. 1A-F.
Figure 2C:
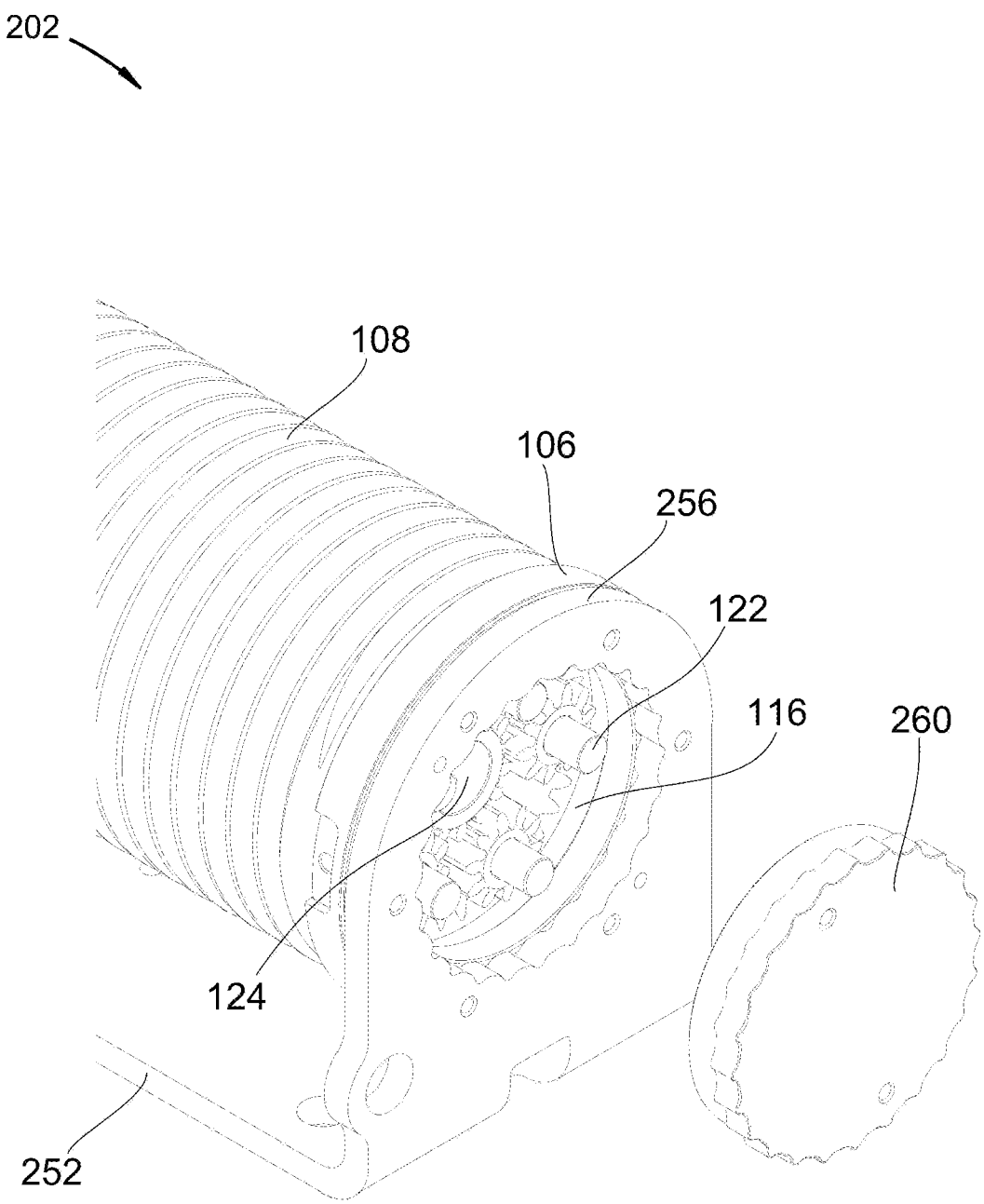
FIG. 2C shows a partially exploded back-top-left isometric view of a portion of the mounting stand of FIG. 2A and the drum of FIGS. 1A-F.
Figure 2D:
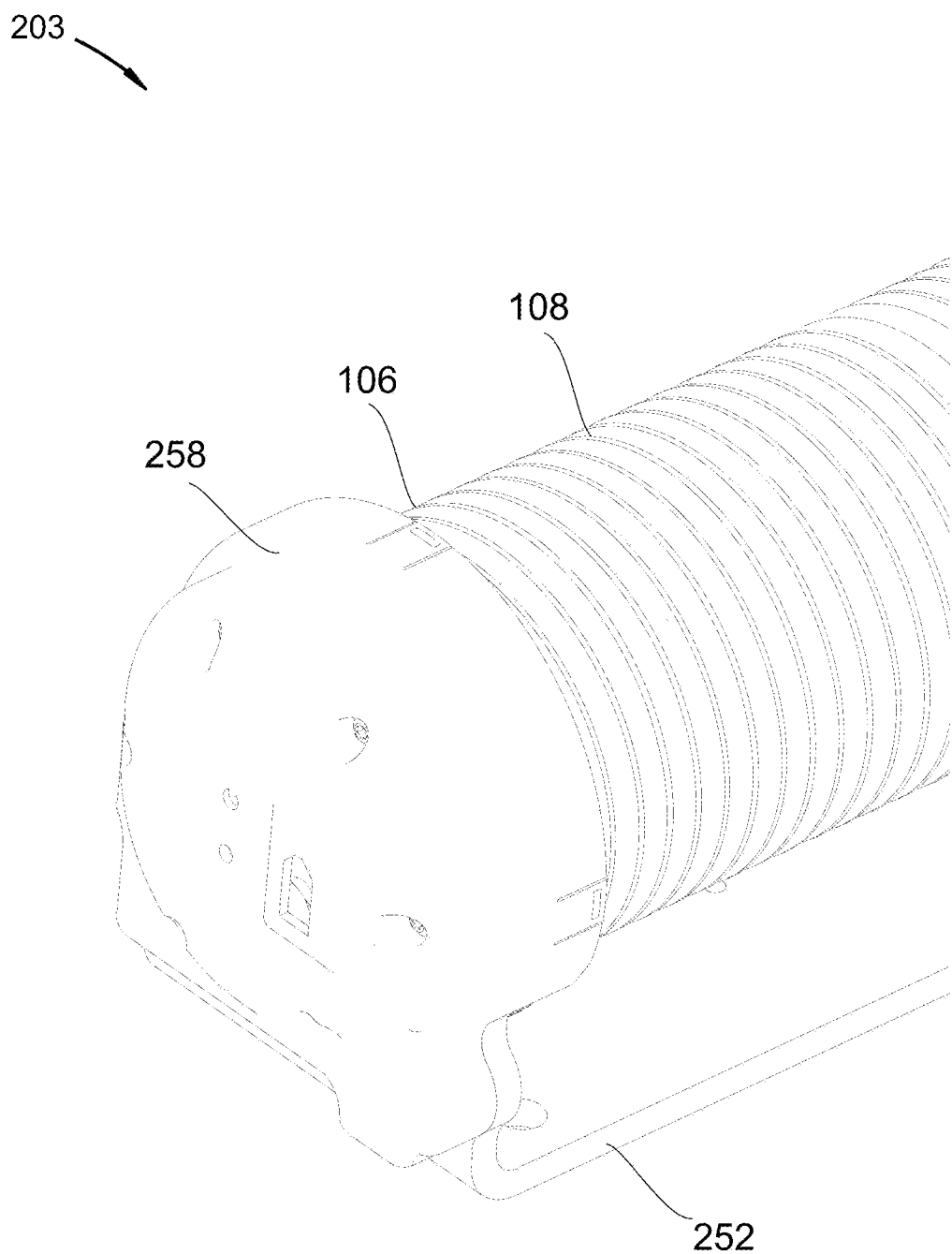
FIG. 2D shows a back-top-right isometric view of a portion of the mounting stand of FIG. 2A and the drum of FIGS. 1A-F.
Figure 2E:
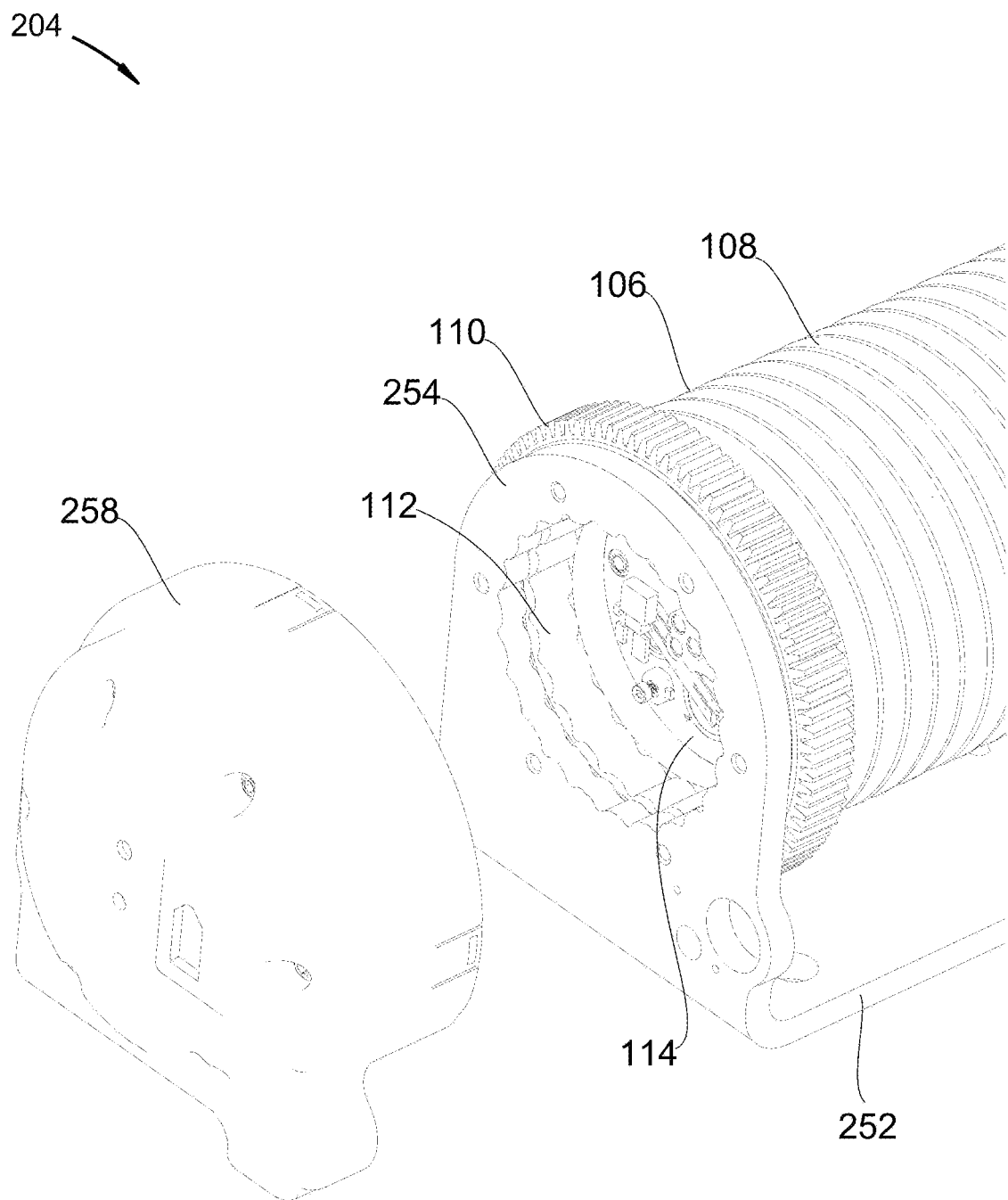
FIG. 2E shows a partially exploded back-top-right isometric view of a portion of the mounting stand of FIG. 2A and the drum of FIGS. 1A-F.

Referring now to FIG. 2, FIGS. 2A-E show various views 200-204 of a mounting bracket 252 on which drum 106 of FIG. 1 is mounted that may be used in the described devices, systems, and methods. FIG. 2A shows a back-top-left isometric view of a portion of mounting bracket 252 and drum 106. FIG. 2B shows a front-top-left isometric view of a portion of mounting bracket 252 of FIG. 2A and drum 106. FIG. 2C shows a partially exploded back-top-left isometric view of a portion of mounting bracket 252 of FIG. 2A and drum 106. FIG. 2D shows a back-top-right isometric view of a portion of mounting bracket 252 of FIG. 2A and drum 106. FIG. 2E shows a partially exploded back-top-right isometric view of a portion of mounting bracket 252 of FIG. 2A and drum 106. Mounting bracket 252 comprises vertical mounting ends 254 and 256, end cap 258, and torque cap 260.

Drum 106 is mounted between vertical mounting ends 254 and 256. The end of drum 106 containing motor 114 mounts to vertical mounting end 254. The end of drum 106 containing gearsets 115, 117, and 119 mounts to vertical mounting end 256. End cap 258 mounts to vertical mounting end 254. In one embodiment, end cap 258 contains an end cap gear (not shown) that is spun by drum gear 110. This end cap gear may have a sensor that monitors its rotation to track the position of drum 106.

Torque cap 260 is a disc with a splined surface that is mounted on last set of planetary gears 122 and on vertical mounting end 256. The splined surface locks with a complementary splined surface of a hole in vertical mounting end 256. This causes last set of planetary gears 122 to be locked in place, unable to move as a set, but only for each planet to rotate individually. In this embodiment, motor 114 is mounted to the same stationary object as last set of planetary gears 122. In other embodiments, the motor may be mounted to a different stationary object. In all instances, the term stationary object should not be construed to mean that the stationary object cannot move in other ways. The mounting bracket of this embodiment could be attached to a moving vehicle, for example. The stationary nature of the object refers to being stationary relative to drum 106, causing rotational force from motor 114 to translate into rotation of drum 106, not of the stationary object. In other examples, the stationary object could be held in place by a person, mounted to a track, affixed to a building, or mounted to the bottom of a helicopter.

Figure 3B:
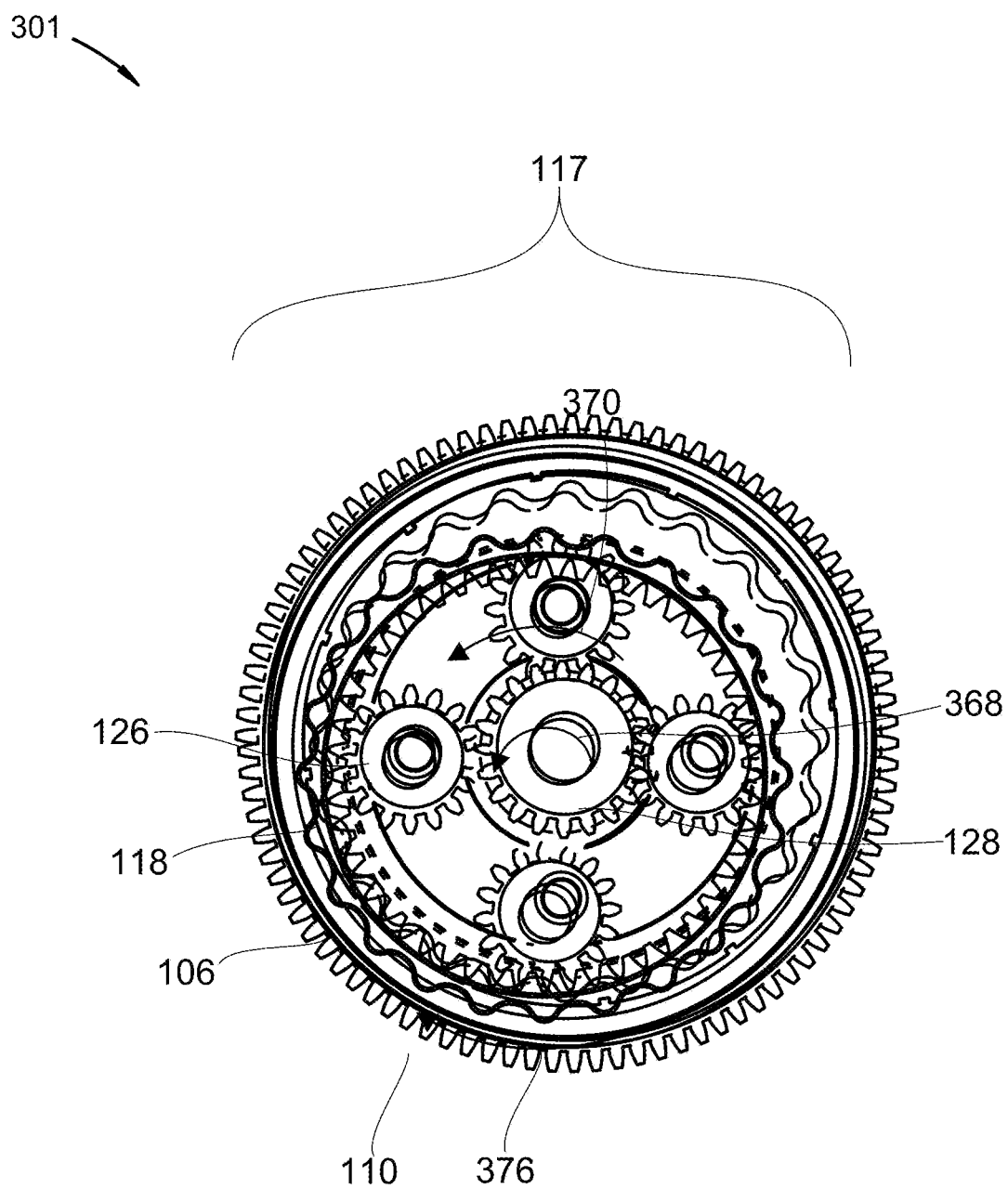
FIG. 3B shows an end-on view of the drum of FIG. 1A, cut through the second gearset.
Figure 3C:
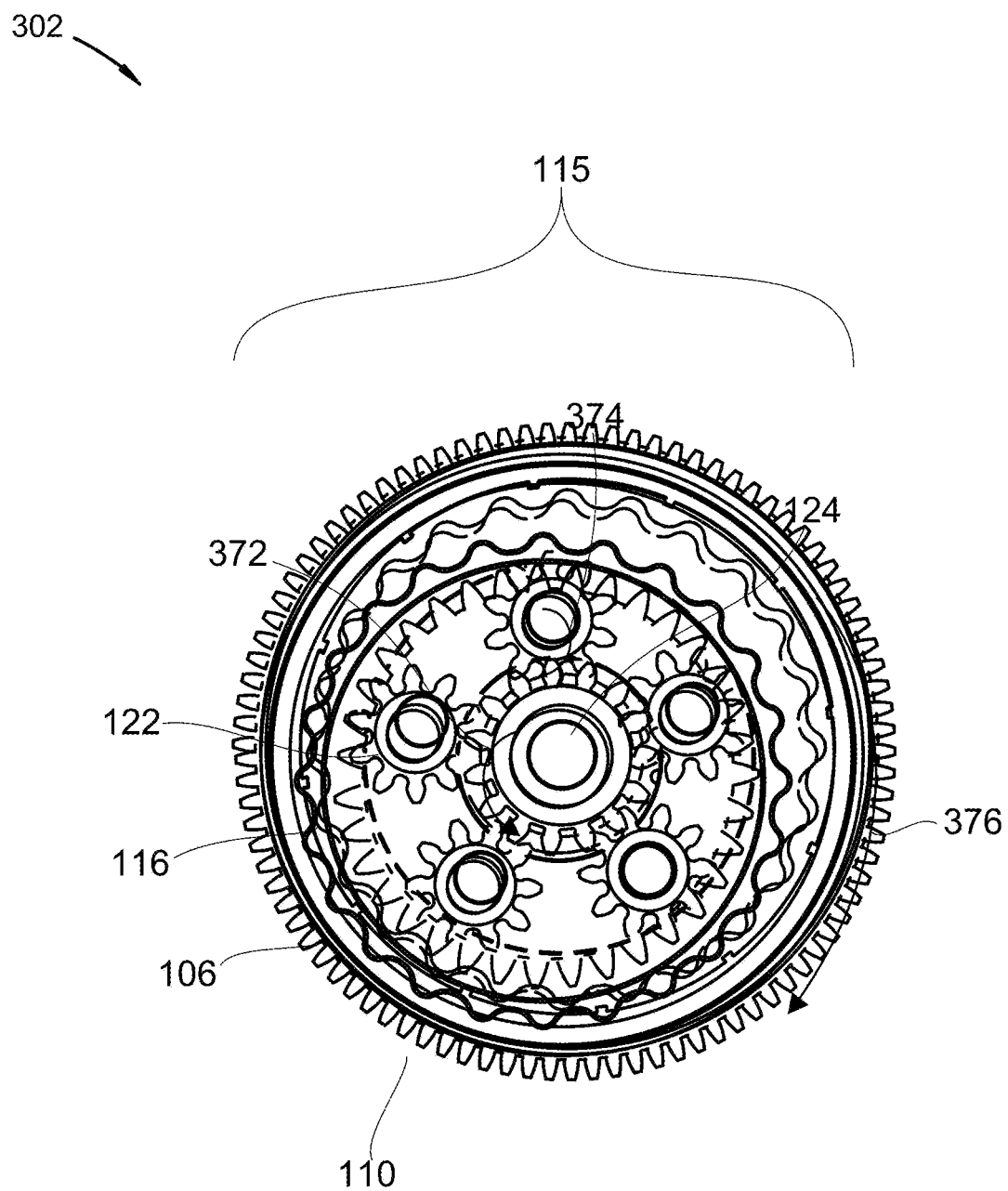
FIG. 3C shows an end-on view of the drum of FIG. 1A, cut through the last gearset.

Referring now to FIGS. 3A-C, FIG. 3A shows an end-on view 300 of drum 106 of FIG. 1A, cut through first gearset 119. FIG. 3B shows an end-on view 301 of drum 106 of FIG. 1A, cut through second gearset 117. FIG. 3C shows an end-on view 302 of drum 106 of FIG. 1A, cut through last gearset 115. First sun gear 362 (not shown in FIG. 1 or 2) appears in FIG. 3C. First sun gear 362 rotates 364 due to motor 114. Rotation 364 causes first set of planetary gears 130 to rotate 366. This results in rotation 368 of second sun gear 128. Second sun gear 128 then rotates 370 second set of planetary gears 126, which rotate 372 last sun gear 124. Rotation 372 results in rotation 374 of the individual planetary gears of last set of planetary gears 122, as last set of planetary gears 122 are locked to torque cap 260. As such, rotation 374 of individual planetary gears of last set of planetary gears 122 causes rotation 376 of last ring gear 116 and drum 106. Rotation 376 propagates back through gearsets 117 and 119, resulting in reduction of rotational speed and an increase in torque to gearsets 117 and 119, and to the final rotational speed and torque of drum 106.

In embodiments with only a first and a last gearset stage, the first planetary gears of the first gearset are coupled to the last sun gear of the last gearset. The first rotational speed and the first torque of the first gearset is delivered to the last sun gear.

In other embodiments, two or more gearsets are staged between the first and the last gearsets.

In embodiments with only a second gearset, the second gearset includes a second sun gear, a second set of planetary gears, and a second ring gear. The second ring gear has a second splined outer surface that mates with a second inner surface of the drum. The second gearset has a second rotational speed and a second torque. The second sun gear is coupled to the first set of planetary gears. The second set of planetary gears are coupled to the last sun gear. The drum further transfers a portion of the last torque to the second splined outer surface of the second gearset, which reduces the second rotational speed of the second gearset and increases the second torque of the second gearset, thereby reducing the last rotational speed of the last gearset and increasing the last torque of the last gearset.

In some embodiments, one or more intermediate gearsets are situated between the first and the last gearsets. The one or more intermediate gearsets each include an intermediate sun gear, an intermediate set of planetary gears, and an intermediate ring gear. The intermediate ring gears have intermediate splined outer surfaces that mate with an intermediate inner surface of the drum. Each of the one or more intermediate gearsets have an intermediate rotational speed and an intermediate torque. The one or more intermediate gearsets are coupled in series and driven by the first set of planetary gears. The last sun gear is driven by the one or more intermediate gearsets. The drum further transfers a portion of the last torque to the intermediate splined outer surfaces of the one or more intermediate gearsets, which reduces the intermediate rotational speeds of the one or more intermediate gearsets and increases the intermediate torque of the one or more intermediate gearsets, thereby reducing the last rotational speed of the last gearset and increasing the last torque of the last gearset.

In some embodiments, the motor is mounted to the stationary object.

In some embodiments, the motor is at least partially enclosed in the drum.

In some embodiments, the drum is a winch spool, with an outer surface of the drum having a ribbed spiraling path for a winch rope to follow. In some embodiments, the winch rope is attached to an end of the drum. In some embodiments, the motor rotates clockwise or counterclockwise such that the winch rope spools or unspools around the drum.

In some embodiments, the motor is mounted to a second stationary object.

In some embodiments, a drilling attachment is attached to the drum at an end opposite the last gearset.

In some embodiments, the drum is manufactured of steel, aluminum, other metals, polymers, composites, or combinations thereof. In some embodiments, the first gearset, the last gearset, and any intermediate gearsets are manufactured of plastic, brass, steel, other metals, or combinations thereof.

In some embodiments, the last set of planetary gears is mounted to the stationary object by a disc, the disc having an edge with a splined surface, and the stationary object having an opening the shape of the disc, such that the disc fits snuggly into the opening and does not rotate.

In some embodiments, an outer surface of the drum has gear teeth. In some embodiments, the drum is coupled to and rotates an internal hub gearing for a wheel, a reel, a grinding or crushing machine, an overhead hoist, fan blades, a rotisserie spit, or a combination thereof.

In some embodiments, the motor drives the first sun gear by driving a series of other gears that are coupled to the first sun gear.

The invention claimed is:

1. A transmission apparatus, comprising:
    a first gearset comprising a first sun gear, a first set of planetary gears, and a first ring gear, wherein the first ring gear comprises a first splined outer surface, the first gearset having a first rotational speed and a first torque, wherein the first sun gear is driven by a motor;
    a last gearset comprising a last sun gear, a last set of planetary gears, and a last ring gear, wherein the last ring gear comprises a last splined outer surface, the last gearset having a last rotational speed and a last torque, wherein the last rotational speed and the last torque are based on the first rotational speed and the first torque, and wherein the last set of planetary gears is mounted to a stationary object; and
    a drum enclosing and mating with the first gearset and the last gearset, the drum comprising a first splined inner surface that mates with the first splined outer surface and a last inner surface that mates with the last splined outer surface, wherein the last splined outer surface transfers the last torque of the last gearset directly to the drum, and wherein the drum transfers at least a portion of the last torque to the first splined outer surface of the first gearset, which reduces the first rotational speed of the first gearset and increases the first torque of the first gearset, thereby reducing the last rotational speed of the last gearset and increasing the last torque of the last gearset.

2. The transmission apparatus of claim 1, wherein the first planetary gears of the first gearset are coupled to the last sun gear of the last gearset.

3. The transmission apparatus of claim 2, wherein the first rotational speed and the first torque of the first gearset is delivered to the last sun gear.

4. The transmission apparatus of claim 1, further comprising:
    a second gearset comprising a second sun gear, a second set of planetary gears, and a second ring gear, wherein the second ring gear comprises a second splined outer surface that mates with a second inner surface of the drum, the second gearset having a second rotational speed and a second torque, wherein the second sun gear is coupled to the first set of planetary gears, and wherein the second set of planetary gears are coupled to the last sun gear.

5. The transmission apparatus of claim 4, wherein the drum further transfers a portion of the last torque to the second splined outer surface of the second gearset, which reduces the second rotational speed of the second gearset and increases the second torque of the second gearset, thereby reducing the last rotational speed of the last gearset and increasing the last torque of the last gearset.

6. The transmission apparatus of claim 1, further comprising:
    a plurality of intermediate gearsets comprising intermediate sun gears, intermediate sets of planetary gears, and intermediate ring gears, wherein the intermediate ring gears comprise intermediate splined outer surfaces that mate with an intermediate inner surface of the drum, the plurality of intermediate gearsets having intermediate rotational speeds and intermediate torques, wherein the plurality of intermediate gearsets are coupled in series and driven by the first set of planetary gears, and wherein the last sun gear is driven by the plurality of intermediate gearsets.

7. The transmission apparatus of claim 6, wherein the drum further transfers a portion of the last torque to the intermediate splined outer surfaces of the plurality of intermediate gearsets, which reduces the intermediate rotational speeds of the plurality of intermediate gearsets and increases the intermediate torque of the plurality of intermediate gearsets, thereby reducing the last rotational speed of the last gearset and increasing the last torque of the last gearset.

8. The transmission apparatus of claim 1, wherein the motor is mounted to the stationary object, and wherein the motor is at least partially enclosed in the drum.

9. The transmission apparatus of claim 1, wherein the motor is configured to receive a burst of current that exceeds a maximum operating current of the motor for a predetermined time on startup.

10. The transmission apparatus of claim 9, wherein the drum comprises a winch spool, an outer surface of the drum comprising a ribbed spiraling path for a winch rope to follow.

11. The transmission apparatus of claim 10, wherein the winch rope is attached to an end of the drum.

12. The transmission apparatus of claim 11, wherein the motor rotates clockwise or counterclockwise such that the winch rope spools or unspools around the drum.

13. The transmission apparatus of claim 1, wherein the motor is mounted to a second stationary object.

14. The transmission apparatus of claim 1, wherein a drilling attachment is attached to the drum at an end opposite the last gearset.

15. The transmission apparatus of claim 1, wherein the drum comprises steel, aluminum, other metals, polymers, composites, or combinations thereof.

16. The transmission apparatus of claim 1, wherein the first gearset and the last gearset comprise plastic, brass, steel, other metals, or combinations thereof.

17. The transmission apparatus of claim 1, wherein the last set of planetary gears is mounted to the stationary object by a disc, the disc comprising an edge with a splined surface, and the stationary object having an opening the shape of the disc, such that the disc fits snuggly into the opening and does not rotate.

18. The transmission apparatus of claim 1, wherein an outer surface of the drum comprises gear teeth.

19. The transmission apparatus of claim 18, wherein the drum is coupled to and rotates an internal hub gearing for a wheel, a reel, a grinding or crushing machine, an overhead hoist, fan blades, a rotisserie spit, or a combination thereof.

20. The transmission apparatus of claim 1, wherein the motor drives the first sun gear by driving a series of other gears that are coupled to the first sun gear.

\* \* \* \* \*